United States Patent [19]

Gugel et al.

[11] Patent Number: 4,990,473
[45] Date of Patent: Feb. 5, 1991

[54] ZIRCONYL PHOSPHATE CERAMICS, A PROCESS FOR THEIR PRODUCTION AND THEIR USE

[75] Inventors: Ernst Gugel; Isfried Petzenhauser, both of Roedental, Fed. Rep. of Germany

[73] Assignee: Bayer Aktiengesellschaft, Leverkusen-Bayerwerk, Fed. Rep. of Germany

[21] Appl. No.: 364,845

[22] Filed: Jun. 12, 1989

[30] Foreign Application Priority Data

Jun. 22, 1988 [DE] Fed. Rep. of Germany ....... 3820961

[51] Int. Cl.$^5$ ............................................. C04B 35/48
[52] U.S. Cl. .................................... 501/102; 106/450; 106/455
[58] Field of Search ............................... 501/102, 106; 106/286.4, 287.19, 450, 455

[56] References Cited

U.S. PATENT DOCUMENTS 4,703,023 10/1987 Yamai ................................. 501/102

OTHER PUBLICATIONS

Yamai et al., "Low-Thermal-Expansion Polycrystalline Zirconyl Phosphate Ceramic", *J. American Soc.* 68 [5] 73–78, 1985.

*Primary Examiner*—Mark L. Bell
*Assistant Examiner*—Chris Gallo
*Attorney, Agent, or Firm*—Connolly and Hutz

[57] ABSTRACT

Zirconyl phosphate ceramics having high strength and high heat shock resistance, which consist essentially of at least 99% by weight of zirconyl phosphate, zirconium phosphates or both and no other phase material in quantities of more than 1% by weight are useful in ceramic filters and ceramic internal combustion engine parts and are prepared by mixing zirconyl phosphate or substances which form zirconyl phosphate with an antimony compound, moulding the resulting mixture and then sintering the moulded mixture at temperatures of 1200° to 1700° C.

12 Claims, No Drawings

ZIRCONYL PHOSPHATE CERAMICS, A PROCESS FOR THEIR PRODUCTION AND THEIR USE

This invention relates to zirconyl phosphate ceramics of high strength and high heat shock resistance, to a process for their production and to their use.

BACKGROUND OF THE INVENTION

It is known from J. Am. Ceram. Soc., 68 (5)273–78 (1985) that zirconyl phosphate cannot be sintered to materials of significant strength without additives.

In addition, it is known from DE-A No. 3 609 730 that powder mixtures capable of compaction to ceramics of low thermal expansion and high strength by sintering at 1200° to 1700° C. can be produced from mixtures of zirconyl phosphate with compaction aids, such as magnesium oxide, zinc oxide, bismuth oxide, manganese oxide, iron oxide, cobalt oxide, nickel oxide, titanium oxide, cerium oxide, niobium oxide, tantalum oxide or mixtures of these oxides.

In addition, it is known that additions of grain growth promoters, such as $SiO_2$ or metal silicates, produce favorable results in conjunction with the known compaction aids.

One feature common to all these mixtures is that melts of metal orthophosphates are formed during the sintering process, enabling the zirconyl phosphate to be compacted. The ceramics formed are thus all multiple-phase ceramics which means that in addition to α-zirconyl phosphate, other substances are present in the materials in quantities of more than 1%.

The disadvantage of mixtures such as these is that irreversible property changes occur during long-term use at elevated temperature or even at in-use temperatures above the production temperature. This is all the less the case, the less the volume of melt phase which occurs during heating.

Accordingly, the object of the present invention is to provide zirconyl phosphate ceramics which do not have any of the decribed disadvantages.

BRIEF DESCRIPTION OF THE INVENTION

It has now surprisingly been found that these requirements are excellently satisfied by zirconyl phosphate ceramics obtained by sintering zirconyl phosphate compacts in the presence of antimony-containing compounds. The zirconyl phosphate ceramics obtained consist almost entirely of phosphates of zirconium.

DETAILED DESCRIPTION

It has now been found that ceramics according to the present invention have high stability of their strength values after prolonged exposure to high temperatures and are highly heat-shock-resistant. As such, the ceramics of this invention are highly useful in filters and as the fabrication material for internal combustion engine parts. The ceramics of the present invention are zirconyl phosphate ceramics which consist essentially of at least 99% by weight of zirconyl phosphates, zirconium phosphates or both and no other phase material in quantities of more than 1% by weight.

Accordingly, the present invention relates to zirconyl phosphate ceramics of high strength and high heat shock resistance which, apart from zirconyl and/or zirconium phosphates, contain no other phase in quantities above 1% by weight. They preferably have antimony contents of less than 0.5% by weight. In a particularly preferred embodiment, the antimony contents are less than 0.1% by weight. Accordingly, the ceramics according to the invention are high-purity zirconyl phosphate ceramics with no foreign binding phases which combine adequate flexural strength with heat shock resistance and, at the same time, show good long-term strength. In one preferred embodiment, the flexural strength values are $>20$ N/mm².

The zirconyl phosphate cerramics according to the invention may be obtained by carrying out their production in the presence of antimony compounds. Thus antimony compounds are added to zirconyl phosphate or to substances which form phosphate under the reaction conditions and powder compacts are obtained from this material by sintering.

The antimony compounds are $Sb_2O_3$, $Sb_2O_5$ and/or $Sb_2O_4$ or compounds which form these oxides on heating.

Accordingly, the present invention also relates to a process for the production of zirconyl phosphate ceramics of high strength and high heat shock resistance, characterized in that zirconyl phosphate and/or substances which form zirconyl phosphate under the reaction conditions are mixed with antimony compounds, the resulting mixture is then molded and sintered at temperatures of 1200° to 1700° C. The antimony oxide content of the compacts before sintering is preferably between 4 and 30% by weight, expressed as antimony oxide. The antimony oxides are almost completely evaporated during sintering. To obtain particularly high-quality products, it is of advantage to sinter the described mixtures until all or almost all the antimony oxide has evaporated. After sintering, there are only traces of antimony oxide, if any, in the ceramics.

In an alternative embodiment of the process according to the invention, zirconyl phosphate and/or substances which form zirconyl phosphate are presynthesized by mixing and calcining to antimony-containing zirconyl phosphate. After suitable grinding, optionally mixing with non-pre-synthesized material molding and sintering, substantially antimony-free ceramics having strengths of more than 60 N/mm² are obtained.

It has also been found that the known additions of the oxides described in the literature can also be gradually improved in their effectiveness and, hence, reduced in their content by the use of antimony oxides.

The ceramics produced in accordance with the invention show high stability of their strength values after prolonged exposure to temperatures of the type encountered in practical applications. The ceramics are heat-shock-resistant and even local heating with a cutting torch to white heat does not destroy the material. No reduction in strength was observed after such treatments.

The present invention also relates to the use of the zirconyl phosphate ceramics according to the invention as ceramic filters or as components of internal combustion engines, for example as port liners. The following Examples are intended to illustrate the invention without limiting it in any way.

EXAMPLE 1

500 g of a β-zirconyl phosphate powder, grain size $<10\mu m$, were mixed with 50 g of $S_b2O_3$ (about 9% by weight) compressed to 5 mm thick tablets and calcined for 4 hours at 1400° C. The cerramic platelets obtained were removed from the hot furnace and quenched. They had a flexural strength of 21 N/mm², an open porosity of 14% and a coefficient of thermal expansion of $1 \cdot 10^{-6}/K$ for the temperature range from 20° to 1000° C. with a substantially linear trend and a very narrow hysteresis curve.

EXAMPLE 2

100 g $Sb_2O_3$ were added to 500 g β-zirconyl phosphate and the resulting mixture was compressed to tablets and calcined at 1200° C. The product formed, which contained 15.1% $Sb_2O_4$, was reduced to a grain size of less than 63 μm in a disc vibration mill, compressed to tablets and sintered as in Example 1. The ceramic had a flexural strength of 60 N/mm² for a porosity of 6% and a coefficient of thermal expansion of $1.2 \cdot 10^{-6}/K$ with a substantially linear trend and a very narrow hysteresis curve.

Disc-form ceramics 4.5 cm in diameter produced in accordance with Examples 1 and 2 were tempered for 168 hours at 1400° C. No reduction in strength was observed. The ceramics showed such high resistance to heat shock that plates which had been heated to 1400° C. could be quenched in cold water without shattering.

What is claimed is:

1. Zirconyl phosphate ceramics having high strength and high heat shock resistance, which consist of zirconyl phosphates, zirconium phosphates or both, together with detectable amounts of antimony but which amount is less than 0.5% by weight.

2. Zirconyl phosphate ceramics as claimed in claim 1 which have a detectable antimony content but which is less than 0.1% by weight.

3. Zirconyl phosphate ceramics as claimed in claim 1 which have a flexural strength of greater than 20 N/mm².

4. A process for the production of zirconyl phosphate ceramics having high strength and high heat shock resistance, which consist essentially of at least 99% by weight of zirconyl phosphates, zirconium phosphates or both and no other material in quantities of more than 1% by weight, which process comprises mixing zirconyl phosphate or substances which form zirconyl phosphate with an antimony compound, moulding the resulting mixture and then sintering the moulded mixture at temperatures of 1200° to 1700° C.

5. A process as claimed in claim 4 wherein the antimony oxide content of the moulded mixture before sintering is between 4 and 30% by weight, expressed as antimony oxide ($Sb_2O_4$).

6. A process as claimed in claim 4 wherein sintering is prolonged until almost all antimony oxide has evaporated.

7. A process as claimed in claim 4 wherein the zirconyl phosphate or substance which forms zirconyl phosphate are presynthesized with antimony oxide by mixing and calcining to form antimony-containing zirconyl phosphate.

8. Zirconyl phosphate ceramics consisting essentially of 99% by weight and a detectable amount of antimony which is less than 0.5% by weight, prepared by the process according to claim 4.

9. Zirconyl phosphate ceramics according to claim 8 wherein the antimony content is less than 0.1% by weight.

10. Ceramic internal combustion engine parts which contain as the ceramic material the zirconyl phosphate ceramics as claimed in claim 1.

11. A process as claimed in claim 5 wherein sintering is prolonged until the antimony content is less than 0.5% by weight.

12. Ceramic filters which contain as the ceramic material the zirconyl phosphate ceramics as claimed in claim 1.

* * * * *